United States Patent [19]

Sulmone

[11] Patent Number: 5,139,393

[45] Date of Patent: Aug. 18, 1992

[54] THERMAL RELIEF VALVE

[75] Inventor: Michael Sulmone, Trooper, Pa.

[73] Assignee: Hale Fire Pump Company, Conshohocken, Pa.

[21] Appl. No.: 653,676

[22] Filed: Feb. 11, 1991

Related U.S. Application Data

[62] Division of Ser. No. 479,765, Feb. 13, 1990, Pat. No. 5,018,665.

[51] Int. Cl.[5] .................. F04B 49/00; F04B 39/02
[52] U.S. Cl. .................. 417/292; 417/369; 417/370
[58] Field of Search .................. 417/292, 369, 370

[56] References Cited

U.S. PATENT DOCUMENTS

| | | | |
|---|---|---|---|
| 3,744,935 | 7/1973 | Magni | 417/370 |
| 4,426,196 | 1/1984 | Bristow et al. | 417/292 |
| 4,854,373 | 8/1989 | Williams | 417/370 |
| 4,913,102 | 4/1990 | Ohmura et al. | 417/292 |

Primary Examiner—Richard A. Bertsch
Assistant Examiner—Alfred Basichas
Attorney, Agent, or Firm—Frank A. Follmer

[57] ABSTRACT

A thermal relief valve is constructed and arranged to sense the fluid temperature of a pump and to open when this fluid temperature becomes too high to discharge pump fluid to prevent the occurrence of an excessive temperature condition of the pump fluid.

5 Claims, 3 Drawing Sheets

THERMAL RELIEF VALVE

This is a divisional of co-pending application Ser. No. 479,765 filed on Feb. 13, 1990, now U.S. Pat. No. 5,018,665.

BACKGROUND AND SUMMARY OF THE INVENTION

This invention relates generally to pumps and, more particularly, to a thermal relief valve for pumps for fluids such as water, ethylene glycol, aqueous firefighting foam fluid, or the like.

During the operation of some types of pumps, it is possible that the temperature of the pump fluid will be caused to rise to a temperature which is too hot for the safe operation of the pump. This would occur, for example, when a pump operator closes the discharge lines of the pump and allows the pump to operate for too long a period of time in a "dead head" condition. This could result in damage to the pump and injury to the pump operator as a result of the fluid temperature becoming too hot for safe operation.

It is the general object of the invention to provide a thermal relief valve for pumps which will operate to open and discharge fluid from the pump when an excessive temperature of the pump fluid is sensed. The thermal relief valve of the invention protects the pump from damage and the operator from injury by allowing the hot fluid to be discharged from the pump automatically when the pump fluid rises to an excessive temperature condition. This fluid discharge prevents the overheating of the pump fluid that could cause the pump fluid to boil and the pump pressure to rise beyond a critical limit. When the thermal relief valve of the invention causes the hot fluid to be discharged from the pump, cool fluid is drawn into the pump by way of the pump suction or inlet whereby the temperature of the pump fluid will stabilize at a safe temperature controlled by temperature sensing means of the thermal relief valve.

Briefly stated, the thermal relief valve in accordance with the invention is adapted to sense the fluid temperature of the pump and to open when this fluid temperature becomes too high and discharge the hot fluid from the pump. The thermal relief valve comprises a valve body which defines a flow control chamber and has an inlet for delivering fluid from the pump to the flow control chamber. There is also provided a relief passage means in the valve body for the flow of fluid from the flow control chamber to discharge and seal means at the upstream end of the relief passage means. The thermal relief valve of the invention also comprises a control means cooperable with the seal means to block flow therepast in a first control position and to permit flow therepast to the relief passage (and discharge) in a second control position. There is also provided a temperature responsive means for actuating the control means between said first and second control positions, the temperature responsive means including a temperature sensing means contained within the valve body and having an actuating member mounted for movement through an actuating movement in response to the sensing of a temperature increase by the temperature sensing means. The elements of the thermal relief valve are constructed and arranged so that the control means is operatively connected to the temperature responsive means to be movable between its first and second control positions in response to the movement of the actuating member through its actuating movement to thereby discharge pump water when an elevated temperature condition is sensed.

In accordance with another feature of the invention, there is provided a control means in the form of a piston which is movable within a cylinder chamber and is designed to have a pressure balance across the upstream and downstream sides thereof whereby the thermal relief valve can be actuated between its control positions by a minimum of actuating force.

In accordance with another feature of the invention, the design of the elements of the thermal relief valve are compact and such that the valve can be mounted directly into the pump body or in any piping system by threaded engagement thereof.

In accordance with another feature of the invention, the temperature sensing means comprises a wax element actuator.

The above and other objects and features of the invention will become apparent from the following detailed description.

DETAILED DESCRIPTION OF THE PREFERRED EMBODIMENT

Figure 1:
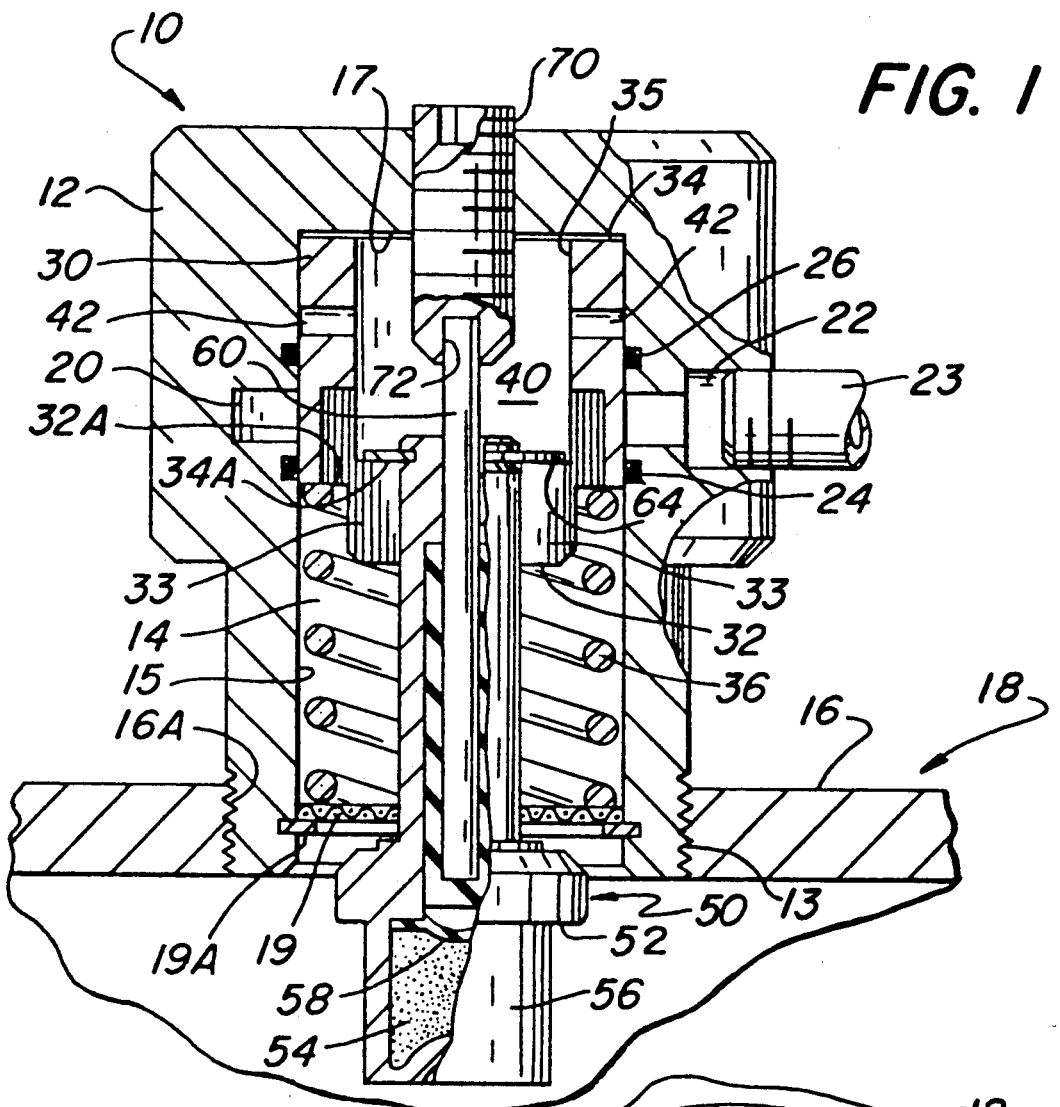
FIG. 1 is a sectional view, in elevation, of a thermal relief valve in accordance with the invention mounted in an opening in a pump body.
Figure 3:
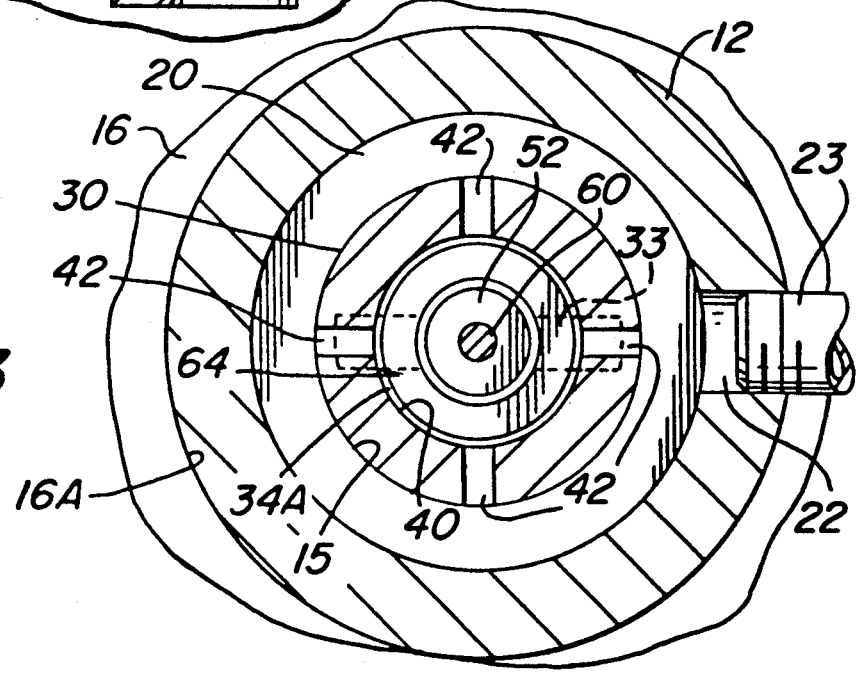
FIG. 3 is a sectional view taken generally on line 3—3 of FIG. 2.

The thermal relief valve in accordance with the invention is indicated generally at 10 and comprises a housing or valve body 12 having a generally cylindrical configuration and defining a flow control chamber internally in the form of a cylinder chamber 14. Valve body 12 is externally threaded at its inner end 13 so as to be adapted to be threadedly mounted in a threaded opening 16A in the body 16 of a pump 18. By this threaded construction, valve body 12 can be mounted at various locations on the pump 18 or in any piping system so as to gain access to the pump fluid. Cylinder chamber 14 is formed by a cylindrical bore 15 which is open at its inner end and closed at its outer end at an end wall 17. The open inner end of bore 15 provides an inlet through which the pump fluid is delivered to chamber 14. A perforated metal screen 19 is mounted by means of a retaining ring 19A at this inlet to filter the fluid passing from the pump through the inlet into chamber 14.

Valve body 12 has a relief passage means formed therein for the flow of fluid from chamber 14 to discharge, i.e., to atmosphere, as shown in the embodiment of the invention shown in the Drawings. Such relief passage means comprises an annular groove 20 in body 12 extending around bore 15 at a medial axial location thereof and a discharge port 22 extending radially outwardly from groove 20 to the exterior of valve body 12 for connection to a discharge pipe 23.

A seal means is provided at the upstream end of the relief passage means and comprises a pair of O-ring seals 24 and 26. Seal 24 extends around bore 15 at a location inwardly of groove 20. Seal 26 extends around bore 15 at a location outwardly of groove 20.

There is provided a control means cooperable with the seal means to block flow therepast in a first control position, (i.e., a "valve closed" position) and to permit flow past the seal means to the relief passage means in a second control position (i.e., a "valve open" position). The control means comprises a piston 30 having a cylindrical configuration and slidably mounted for movement within bore 15 between the first control position shown in FIG. 1 and the second control position shown in FIG. 2. Piston 30 has its upstream side 32 facing inwardly toward the inlet end of chamber 14 and its downstream side 34 facing the outer end wall 17 of chamber 14. Piston 30 is biased toward the first control position (i.e., the "valve closed" position shown in FIG. 1) by means of a compression spring 36 which is mounted in compression between the screen 19 and a recessed annular portion 32A of the upstream side 32 of piston 30.

In accordance with a feature of the invention, piston 30 is designed to provide a pressure balance thereacross, i.e., the pressure on upstream side 32 is equal to the pressure on downstream side 34, said sides having the same projected area. By reason of this pressure balance design, the piston can be moved between the first and second control positions thereof regardless of the pressure inside the pump and by a minimal force, which force must be provided by a temperature sensing means to be described hereafter. To this end, the piston 30 is provided with two diametrically opposed, milled slots 33 that extend axially between the upstream side 32 and the downsteram side 34 of piston as shown in the Drawings.

Piston 30 is provided with an internal chamber 40 on the downstream side thereof formed by an axial bore 35 extending inwardly from the downstream side 34 and terminating at an annular wall portion 34A thereof. Piston 30 is also provided with relief ports providing flow communication between the internal piston chamber 40 and the surface of the bore 15 forming cylinder chamber 14. Such relief ports comprise four circumferentially equally spaced, radially extending cross-holes 42 located in a transverse plane spaced inwardly from the downstream side 34 of piston 30, as is shown in the Drawings. The cross-holes 42 are located axially so as to be positioned above seal 26 in the first control position of piston 30 (FIG. 1) and to be aligned with annular groove 20 in the second control position of piston 30 (FIG. 2) which arrangement is shown in the Drawings.

Figure 2:
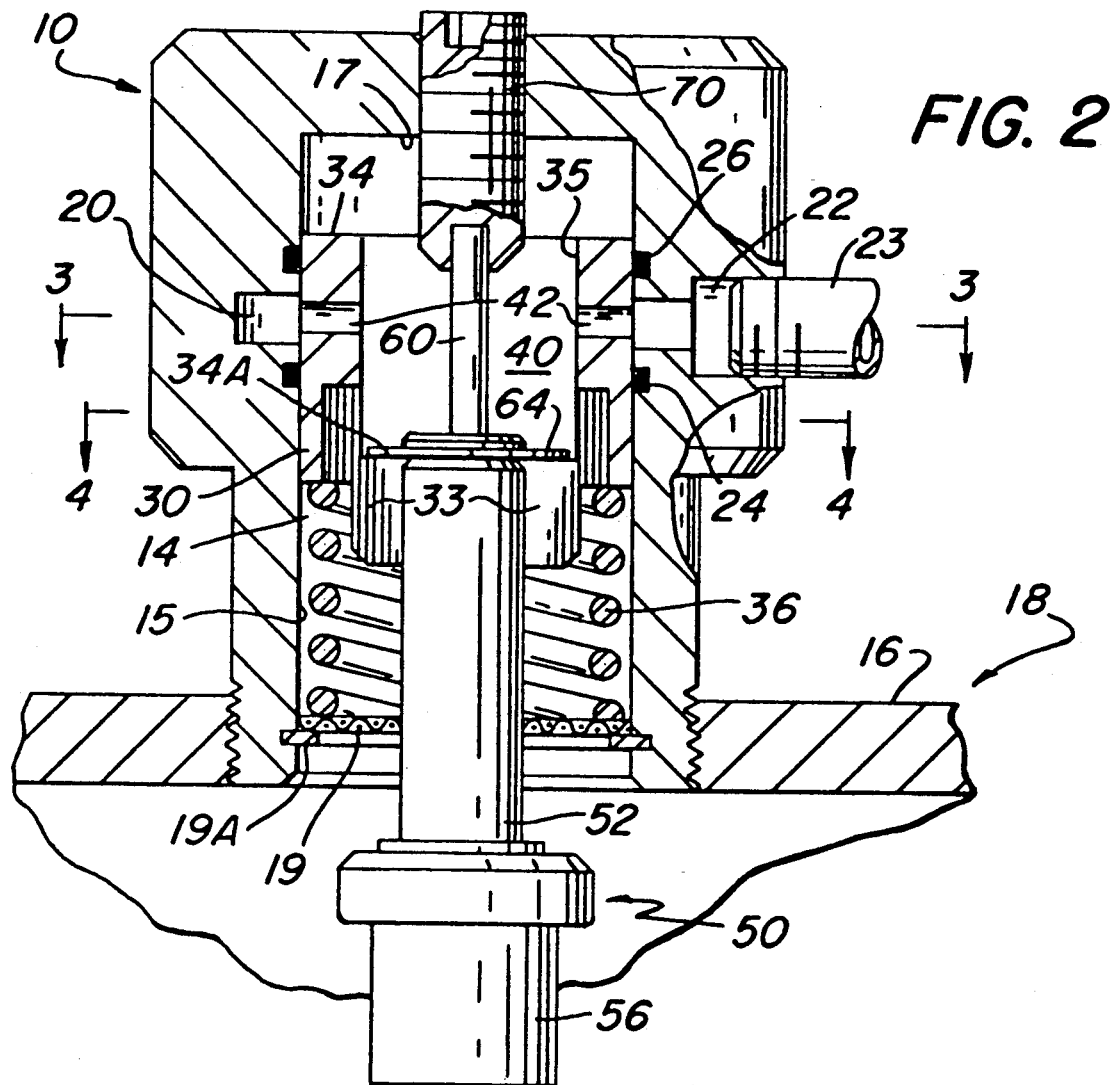
FIG. 2 is a view similar to FIG. 1 with the thermal relief valve shown in the open position.
Figure 4:
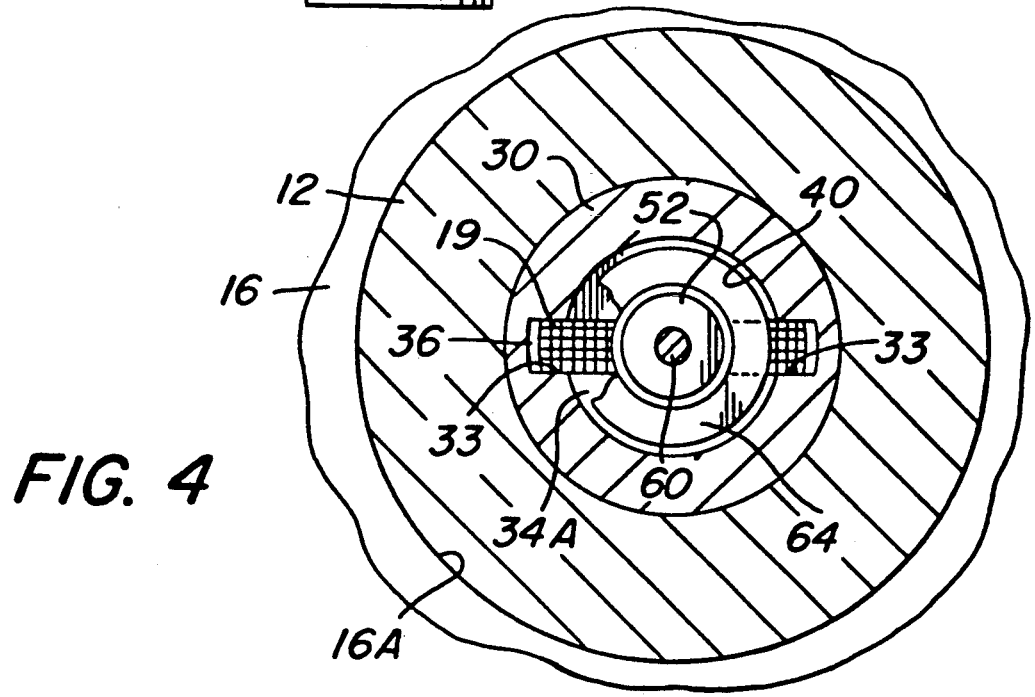
FIG. 4 is a sectional view taken generally on line 4—4 of FIG. 2.

By reason of the construction and arrangement as described above, when piston 30 is in the first control position, flow from chamber 14 or piston chamber 40 to groove 20 of the relief passage means is blocked by the cooperation between the piston 30 and the seals 24 and 26. Thus, as shown in FIG. 1, the outer surface of the piston 30 is in sealing contact with seals 24 and 26 whereby the fluid in this piston chamber 40 cannot flow to the annular groove 20 by way of the cross-holes 42 since they are located above seal 26, and the fluid in chamber 14 cannot flow to annular groove 20 because of seal 24. However, when the piston 30 is moved to the second control position (the "valve open" position) shown in FIG. 2, fluid can flow from the piston chamber 40 radially outwardly through the cross-holes 42 into the annular groove 20 and from this annular groove 20 into the discharge port 22 for discharge from the pump to atmosphere by pipe 23.

In accordance with the invention, the thermal relief valve 10 comprises temperature responsive means for actuating piston 30 between said first and second control positions thereof. Such temperature responsive means comprises a device known in the art as a "wax element actuator" which is a device that transforms temperature changes into the movement of an actuating pin. Suitable devices for use in valve 10 are the "CAL-THERM" wax element actuator and the wax element actuator sold by Robertshaw Co. under the trademark "Power Pill". These devices comprise a wax charge containing a metallic powder. The construction is such that the metallic powder remains in suspension with little tendency to separate, thereby maintaining continued full time response throughout the life of the device. The wax element actuator 50 shown in internal detail in FIG. 1 is the "Power Pill" type and comprises a body 52 having a generally cylindrical construction and mounted to extend within a central hole in screen 19 so as to be guided for movement within bore 15 along the longitudinal axis thereof. Body 52 contains a specially formulated wax material 54 with controlled thermal expansion properties sealed inside a copper, cup-shaped element 56 by a rubber diaphram 58. Temperature changes produce volumetric expansion and contraction of the wax material 54 (by phase changes thereof) which is translated into movement of an actuating pin 60 through a precision-molded elastomer stem seat 62.

The operation of actuator 50 is well known in the art. Briefly, the body 52 of the actuator 50 is mounted for conjoint movement with piston 30 by means of a retaining ring 64 secured on the end of body 52 so as to contact the annular wall portion 34A at the downstream side of piston 30, as is shown in detail in the Drawings. The actuating pin 60 is mounted within the body 52 for movement through an actuating movement relative to the body 52 in response to the sensing of a temperature increase by the wax charge 54 of actuator 50. Actuating pin 60 is arranged to extend axially within the internal piston chamber 40 to contact a stop means mounted in valve body 12 in alignment therewith, as shown in the Drawings. The stop means comprises a set screw 70 threadedly mounted in the outer end of body 12 in a manner so as to be adjustable to a desired set position. The set screw 70 is sealed by a suitable anaerobic thread sealant and has a bore 72 adapted to receive the extended end of actuating pin 60.

The operation of the thermal responsive valve 10 to control the temperature of the fluid of the pump 18 will now be described.

It is noted that the thermal relief valve 10 is preferably mounted in the pump body 16 in a vertical position with the temperature sensing means located to be responsive to the temperature of the pump fluid. It will be apparent that the thermal relief valve 10 may be mounted at various locations including a suitable piping location of the pump 18. Under the normal operation of the pump 18, the thermal relief valve 10 will be in the first (valve closed) control position shown in FIG. 1 with the piston 30 cooperating with seals 24 and 26 to block flow therepast to groove 20. If the pump fluid rises to a preset, unsuitably high, temperature, the wax charge 54 liquifies and expands. This causes the relative movement between actuating pin 60 and the actuator body 52 and, since pin 60 is restrained from movement by the set screw 70 in the valve body 12, the actuator body 52 moves downwardly, as viewed in FIG. 1. Further, since the actuator body 52 is coupled to the piston 30 by the retaining ring arrangement, both the piston 30 and the actuator body 52 move together against the bias of spring 36 from the position shown in FIG. 1 downwardly to the second (valve open) control position shown in FIG. 2. This allows pump fluid to discharge to atmosphere. In this discharge flow path, the pump fluid from the pump interior passes through screen 19 at the inlet end of the valve body 12 into the lower end of chamber 14, from which it flows through the milled slots 33 into the internal piston chamber 40 on the downstream side of the piston 30. From this internal piston chamber 40 the fluid flows radially outwardly through the four cross-holes 42 into the annular groove 20 in valve body 12 and from this annular groove 20 through the discharge port 22 to atmosphere by way of pipe 23. While pump fluid is being discharged to atmosphere, cool fluid is drawn into the pump by way of the pump suction or inlet and the temperature of the pump fluid stabilizes at a predetermined activation temperature which causes the wax element actuator 50 to reset the thermal relief valve 10 to the first control position shown in FIG. 1. To this end, the decreasing temperature of the wax charge 54 causes it to contract and solidify. This allows the piston 30 and the actuator body 52 to move upwardly from the position shown in FIG. 2 to the position shown in FIG. 1 under the action of the biasing spring 36. The piston 30 continues to move upwardly to a position whereby the cross-holes 42 are located above seal 26. Piston 30 is now in a flow blocking position in cooperation with the sealing means 24 and 26 as discussed above.

It will be apparent that the thermal relief valve in accordance with the invention achieves the general object of the invention and has various advantageous features.

One important feature is the pressure balance across the piston 30. By reason of this design, the thermal relief valve 10 will operate regardless of the pressure inside the pump 18 and essentially independent of the force exerted by the expanding wax charge 54 since the only force resisting this movement is that of the biasing spring 36 and there is no counteracting force provided by a high pressure fluid on the upstream side of the piston 30. It is noted that, without the pressure balanced design, as the pressure in the cavity surrounding the wax element actuator 50 gets higher, the force required to move the piston 30 would increase. Since the force available in the actuator 50 is finite, there becomes a point where the mechanism would not work. This problem is overcome by the pressure balanced design.

Another feature of the design of the thermal relief valve 10 is that it is very compact and can be threaded directly into the pump body or at any location in the piping system associated therewith. Also, the design is such that the thermal relief valve 10 is self-draining when installed in a vertical position.

A further feature in the design is the set screw stop means which allows for continuous adjustment of the device. This adjustment compensates for any differences in the height of the actuating pin 60 of the actuator 50.

Furthermore, by discharging fluid to atmosphere, the thermal relief valve 10 serves as a visual indication to the operator that the pump 18 is operating at an unsafe condition whereby he can take the necessary corrective action.

Also, the activation point of valve 10 can be preset to a wide range of temperatures since there are available in the art a large selection of wax element actuators having a wide range of wax compounds with different melting temperatures.

Figure 5:
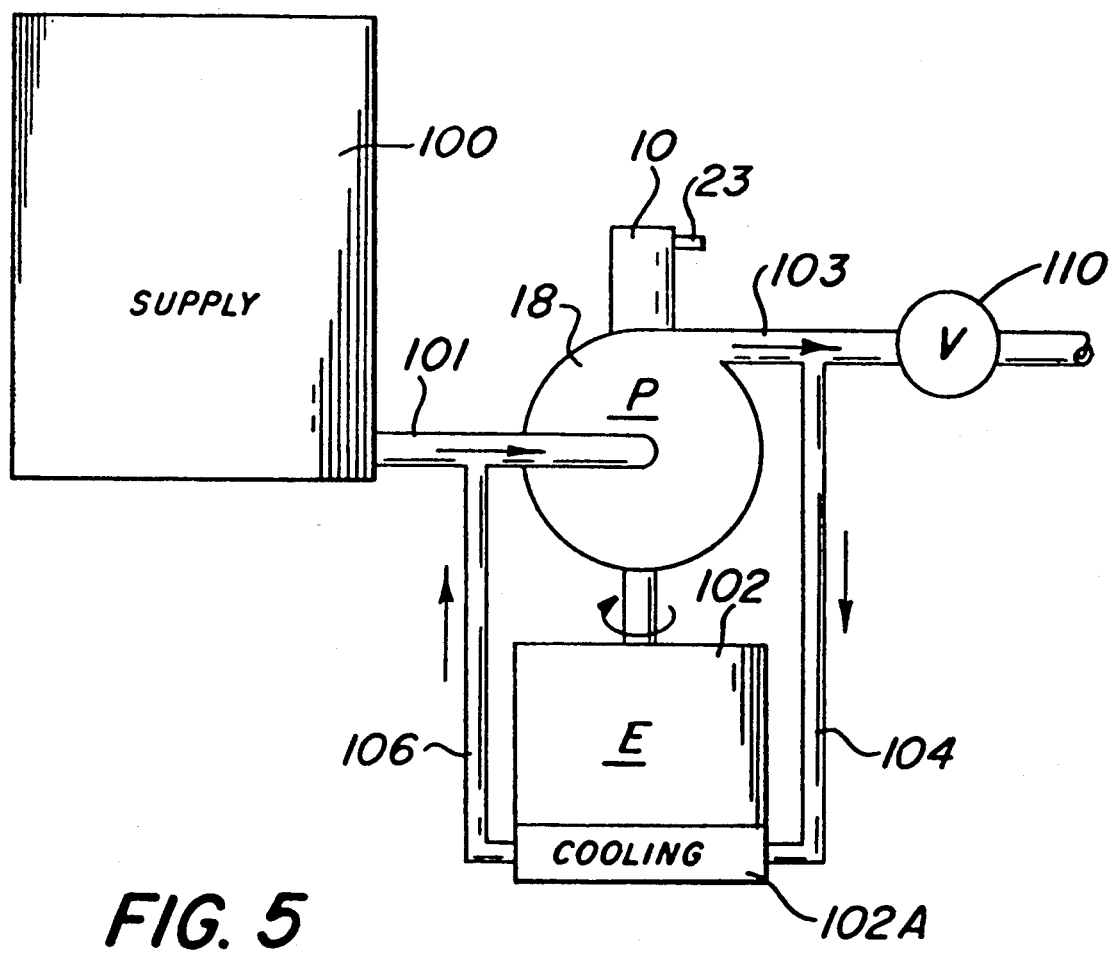
FIG. 5 is a schematic view of a pump system.

A novel application of the thermal relief valve in accordance with the invention is that of a pump system wherein a pump is driven by a fluid-cooled internal combustion engine which has a cooling means supplied with a recirculating cooling fluid flow passing from the discharge side of the pump and returning to the pump suction and wherein the pump draws fluid from a supply to the pump suction and delivers it through a discharge line having a discharge control valve connected therein. This arrangement is shown in FIG. 5, which discloses a pump system comprising pump 18 provided with a thermal relief valve 10 as described above, said valve 10 having its discharge pipe 23 arranged to discharge fluid to atmosphere. Pump 18 is supplied with pumping fluid from a supply tank 100 through a supply line 101 connected to the pump suction. Pump 18 discharges fluid through line 103 which has a discharge control valve 110 connected therein. Pump 18 is driven by an internal combustion engine 102 which has a cooling means 102A supplied with a recirculating cooling fluid flow by means of lines 104 and 106. Line 104 is connected from the discharge line 103 to supply cooling fluid to the inlet of cooling means 102A and line 106 is connected from the outlet of cooling means 102A to the supply line 101 as is shown in FIG. 5. It is noted that the cooling means 102A can take various forms, such a heat exchange arrangement whereby the pump fluid is operative to take heat away from the engine cooling fluid in its own closed loop system or an arrangement, which is known as an open loop system, whereby the pump cooling fluid flows directly through the engine cooling passages to cool the same.

During normal operation of the pump system shown in FIG. 5, fluid is routed from the discharge of pump 18 through line 104 and into the engine cooling means 102A. After the pump cooling fluid takes the heat away from the engine 102, it returns back to the pump suction by way of line 106. The arrangement is such that the fluid that returns to the pump 18 has more energy than it did when it was in line 104 and, therefore, is much hotter by reason of the heat exchange that occurred in the cooling means 102A. During this normal operation with the discharge valve 110 in its open position, there would be no problem with the hot fluid returning back to the pump 18 because cool fluid is constantly being drawn into the pump suction from the supply tank 100 and heat (energy) is discharged out of the system through the discharge valve 110. However, when the valve 110 is closed, there is nowhere for the hot fluid to go. Accordingly, the entire pumping system now becomes a closed loop system. Thus, the fluid leaves the pump 18 and enters line 104 and then travels through the engine cooling means 102A where there is a transfer of thermal energy from the engine cooling means 102A to the pump fluid. This higher temperature fluid then travels back to the pump suction through line 106 and the cycle continues. If this condition were allowed to continue, the system would eventually overheat causing equipment damage and possibly injury to the operator. However, by reason of the installation of the thermal relief valve 10, this does not happen. Instead, the thermal relief valve 10 is shown mounted on the pump body as described in FIGS. 1-4, although valve 10 can be located anywhere in the pumping system. In use, the thermal relief valve 10 senses the increase fluid temperature and activates to move to its open position as described above when this fluid temperature reaches a preset point. When this happens, fluid is then diverted from the pumping system to a point outside the system, namely, atmosphere, a tank, etc. This transforms the closed loop pumping system into an open loop system thereby allowing the thermal energy to leave the system. As the hot fluid passes through the thermal relief valve 10 and is discharged therefrom to leave the system, cool fluid from the supply 100 enters the system 10 through line 101 and the pump suction. As this operating condition is allowed to continue, the entire system will reach an equilibrium point, which is determined by the activation temperature of the thermal relief valve 10, to thereby prevent system damage. When the valve 110 is subsequently open, the supply fluid will cool the system and the thermal relief valve 10 will sense this and automatically reset itself to the closed position in the manner described in detail above.

It will be apparent that various changes may be made in the construction and arrangement of parts without departing from the scope of the invention as defined hereafter by the following claims. For example, the thermal relief valve 10 can be mounted in a water line connected between the suction and discharge lines of the pump and to discharge water to atmosphere when the temperature passing through this line becomes too hot. In this case it will be noted that the water is required to flow through the thermal relief valve and return back to the pump on the suction side thereof. Moreover, various types of valve members and sealing means may be used other than the piston arrangement shown in FIG. 2 and other types of seals may be used other than the disclosed double O-ring seals cooperating with this piston.

What is claimed is:

1. In a pump system wherein a pump is driven by a engine having a cooling means supplied with a recirculating cooling fluid flow passing from the discharge side of the pump and returning to the pump suction, and wherein the pump draws fluid from a supply of cool liquid to the pump suction and delivers it through a discharge line having a discharge control valve connected therein, the improvement comprising:
a thermal relief valve connected in the pump system to communicate with the pump fluid and to sense the temperature of the pump fluid, said thermal relief valve being constructed and arranged to discharge high temperature pump fluid from the pump system to a location outside the pump system to thereby remove heat from the pump system in response to the sensing of a preset high temperature of the pump fluid so that the pump draws cool fluid from the supply thereof to replace the discharged high temperature fluid and thereby maintain a cooling recirculating fluid supply having a cooling capacity sufficient to prevent overheating of the engine.

2. In a pump system according to claim 1 wherein said thermal relief valve is constructed and arranged to discharge high temperature pump fluid from the pump system to atmosphere.

3. In a pump system according to claim 1 wherein said thermal relief valve is constructed and arranged to discharge high temperature pump fluid from the pump system to a tank for containing same.

4. In a pump system according to claim 1 wherein said thermal relief valve has an inlet, a discharge, and a valve mechanism movable between a closed position and an open position for controlling flow between said inlet and said discharge, said thermal relief valve being responsive to the sensing of said preset high temperature of the pump fluid to move said valve mechanism from said closed position to said open position thereof to permit flow from said inlet to said discharge.

5. In a pump system according to claim 4 wherein said thermal relief valve is constructed and arranged to automatically reset itself to said closed position to block flow between said inlet and said discharge in response to sensing a lower temperature of the pump fluid.

* * * * *